Figure 1:
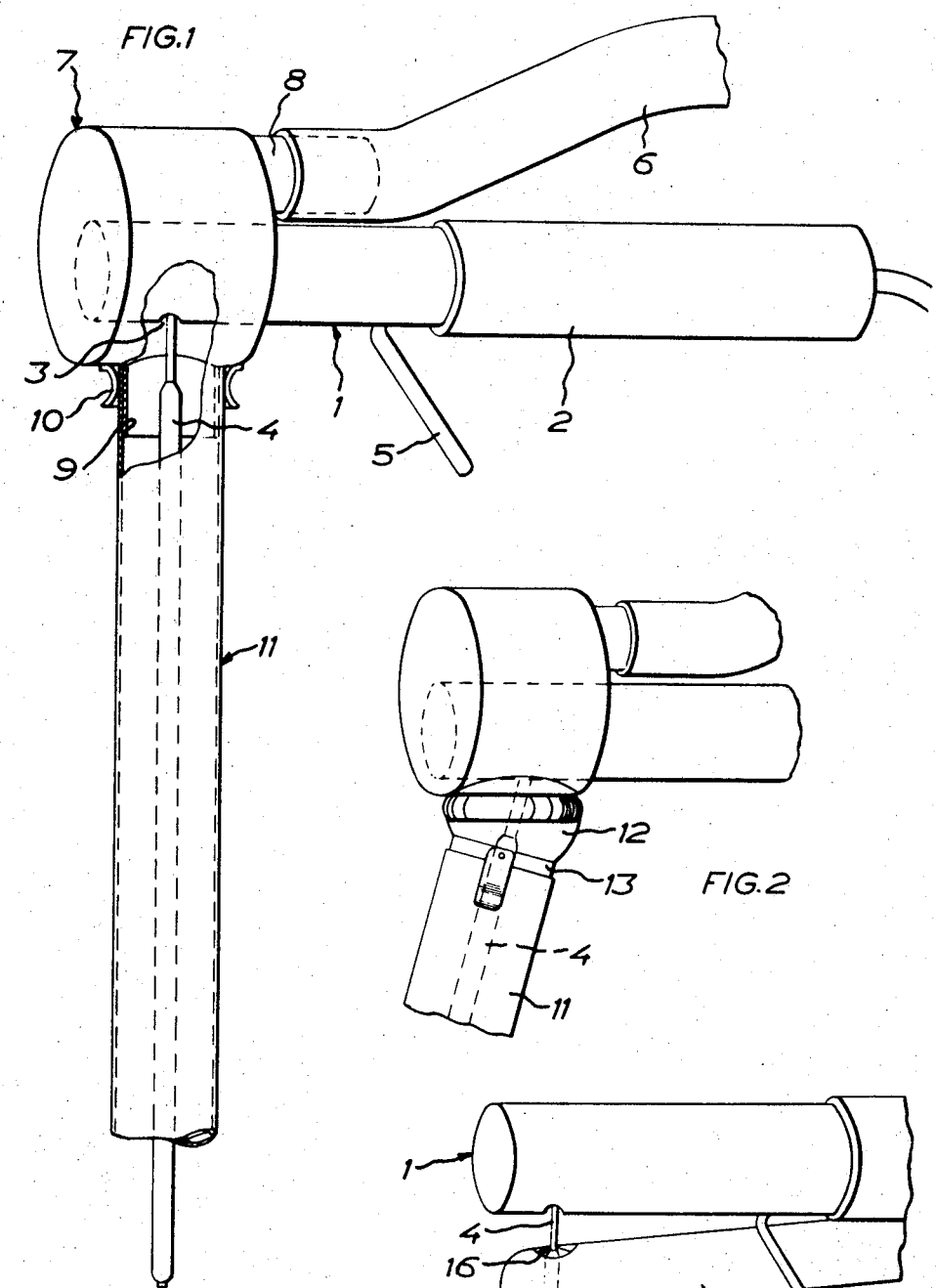

United States Patent
Lindkvist

[15] 3,707,616
[45] Dec. 26, 1972

[54] EXHAUST DEVICES
[72] Inventor: Erik A. Lindkvist, Korpralsvagen 44 a, 902 53 Umea, Sweden
[22] Filed: Nov. 24, 1971
[21] Appl. No.: 201,709

[30] Foreign Application Priority Data
Nov. 25, 1970 Sweden ..........................15947/70

[52] U.S. Cl. ...................219/136, 219/70, 219/130
[51] Int. Cl. ...........................................B23k 9/26
[58] Field of Search.......................219/130, 136, 70

[56] References Cited
FOREIGN PATENTS OR APPLICATIONS
1,134,557  11/1968  Great Britain......................219/130
43/1381  1/1968  Japan..................................219/136

Primary Examiner—R. F. Staubly
Attorney—John Lezdey et al.

[57] ABSTRACT

An exhaust device for gases and fumes in electric welding processes includes an exhaust conduit which is drawn up to the means holding the electrode. Arranged in the exhaust conduit is a connecting socket or like element to which a sleeve enclosing the electrode can be fixed. The sleeve is of such a nature as to be gradually disintegrated by the electric welding arc so that the electrode in the course of its successive consumption will have its end portion located outside the mouth or end of the sleeve.

4 Claims, 3 Drawing Figures

PATENTED DEC 26 1972 3,707,616

EXHAUST DEVICES

The present invention relates to an exhaust device for gases and fumes in electric welding processes, including an exhaust nozzle mounted to the electrode-carrying tool and connectable to an exhaust conduit.

It is known to provide hand shields and electrode holders with exhaust devices in the form of tubes which are directed towards the region of the weld location and suck away fumes produced in the welding process. Most of these prior-art devices, however, are of complicated construction and, if ever utilized in practice, would probably have had but a short life. Another more serious disadvantage of the prior-art devices is that they conceal the weld location, which might lead to a poor working result, and that they generally permit welding on horizontal work-pieces only.

The present invention has for its object to provide a device which can be mounted on arbitrary welding tools and which, at the same time as it permits exhaustion in immediate proximity to the weld location neither conceals said location nor makes work in different planes impossible. According to the invention, the exhaust device comprises holder means, preferably in the form of a socket for a sleeve which constitutes the exhaust nozzle proper, encloses the electrode and extends towards the free end of the electrode, said holder means being connected to the electrode-carrying tool, and said sleeve is of such a nature as to be gradually decomposed or destroyed under the influence of the welding arc so that the electrode in the course of its successive consumption will have its end portion located outside the end of the sleeve.

Figure 2:
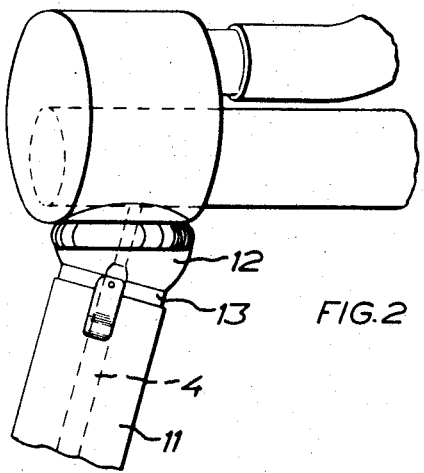
Figure 3:
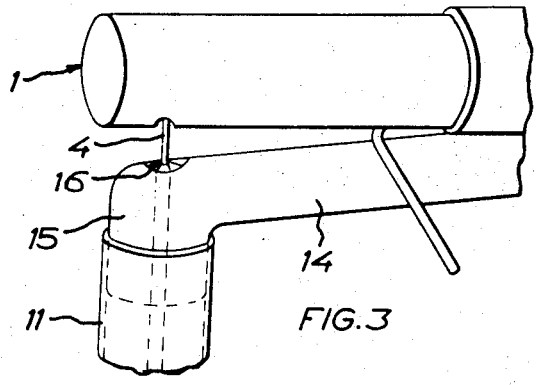

Some embodiments of the invention will be more fully described hereinbelow with reference to the accompanying drawing in which:

FIG. 1 is a perspective view partly in section of an electrode holder equipped with the device according to the invention, FIG. 2 is a modified embodiment of this device, and FIG. 3 is still another embodiment thereof.

The electrode holder 1 has at one end a handle 2 and at the other an opening 3 in which the electrode 4 is intended to be fastened by means of a clamping jaw operated by means of a lever 5. An exhaust conduit or hose 6 which preferably together with the welding cables may be supported in a balanced state by a device (not shown) extends to the front end of the electrode holder where a housing 7 is arranged. The housing 7 has a connecting socket 8 for the exhaust hose 6 and encloses the front end portion of the electrode holder. Adjacent to the opening 3 in which the electrode is to be fastened there are arranged a downwardly directed socket 9 and on said socket, preferably with the aid of clamping means 10, a sleeve 11 which encloses the electrode and constitutes the exhaust nozzle proper.

The sleeve 11 is made of a material of such a nature as to melt, carbonize, pulverize or otherwise to be destroyed or dissolved under the influence of the heat and/or light radiation produced by the electric arc or under other influence therefrom, as the electrode is consumed. The properties of the sleeve material are preferably such that the end of the sleeve always lies somewhat above the end of the electrode, which implies satisfactory possibilities of observing the weld location. The gradually decomposed or melted portions of the sleeve 11 are sucked away through the sleeve and the conduit 6, the vacuum in the sleeve contributing to the decomposition of the sleeve end in that the edge portion thereof gradually decomposed or otherwise weakened under the influence of the electric arc will be sucked or bent inwardly and torn away. The material of the sleeve may be for instance specially treated paper, plastics compositions or metal or metal alloys. Being supported by the electrode, the sleeve can have an insignificant strength.

The sleeve, which thus is a single-use article, may be delivered separately and utilized together with arbitrary electrodes. It is passed over the fastened electrode and onto the flange 9 before welding is commenced. The sleeve, may however, also be delivered combined with an electrode and be mounted together with said electrode in one motion.

Instead of the rigid socket 9 the embodiment shown in FIG. 2 comprises a socket 13 having an articulation 12. In fact, it often happens that the welder is forced to bend the electrode in one direction or the other to get at difficulty accessible points and by reason of the articulated socket 13 the use of an exhaust sleeve is nevertheless made possible.

In the embodiment shown in FIG. 3 the housing 7 has been eliminated and instead a preferably flexible tube 14 is run to the underside of the electrode holder. The tube 14 has an elbow 15 corresponding to the socket 9 and is provided opposite said elbow with an opening 16 through which the electrode 4 is passed.

What I claim and desire to secure by Letters Patent is:

1. An exhaust device for gases and fumes in electric welding processes, including an exhaust nozzle mounted to the electric-carrying tool and connectable to an exhaust conduit, wherein the exhaust device comprises holder means preferably in the form of a socket for a sleeve which constitutes the exhaust nozzle proper, encloses the electrode and extends towards the free end of the electrode, said holder means being connected to the electrode-carrying tool, and said sleeve is of such a nature as to be gradually decomposed or destroyed under the influence of the welding arc so that the electrode in the course of its successive consumption will have its end portion located outside the end of the sleeve.

2. A device as claimed in claim 1, wherein the socket serving as holder means for the sleeve is articulated.

3. A device as claimed in claim 1, wherein a tube elbow is arranged as holder means for the sleeve.

4. A device as claimed in claim 1, wherein the material of the sleeve is specially treated paper or the like, a plastics composition or metal or combinations of said substances.

* * * * *